United States Patent
Noda et al.

(10) Patent No.: US 9,298,178 B2
(45) Date of Patent: Mar. 29, 2016

(54) SHAPE MEASURING APPARATUS

(71) Applicant: MITUTOYO CORPORATION, Kanagawa (JP)

(72) Inventors: Takashi Noda, Tochigi (JP); Hiromi Deguchi, Tochigi (JP)

(73) Assignee: MITUTOYO CORPORATION, Kanagawa (JP)

( * ) Notice: Subject to any disclaimer, the term of this patent is extended or adjusted under 35 U.S.C. 154(b) by 367 days.

(21) Appl. No.: 13/893,864

(22) Filed: May 14, 2013

(65) Prior Publication Data

US 2013/0310962 A1  Nov. 21, 2013

(30) Foreign Application Priority Data

May 17, 2012  (JP) ................. 2012-113596

(51) Int. Cl.
- *G05B 19/18* (2006.01)
- *G05B 19/04* (2006.01)
- *G01B 21/04* (2006.01)
- *G05B 19/401* (2006.01)

(52) U.S. Cl.
CPC .............. *G05B 19/041* (2013.01); *G01B 21/04* (2013.01); *G05B 19/401* (2013.01)

(58) Field of Classification Search
CPC ...... G01B 21/04; G01B 5/008; G01B 17/004; G01B 5/20; G05B 19/401; Y10S 977/85
See application file for complete search history.

(56) References Cited

U.S. PATENT DOCUMENTS

| | | | |
|---|---|---|---|
| 4,769,763 A * | 9/1988 | Trieb et al. ................. 702/168 |
| 5,594,668 A | 1/1997 | Bernhardt et al. |
| 5,966,681 A * | 10/1999 | Bernhardt et al. ............. 702/152 |
| 6,044,569 A * | 4/2000 | Ogihara et al. ................. 33/503 |
| 7,254,506 B2 | 8/2007 | McMurtry et al. |
| 7,643,963 B2 * | 1/2010 | Noda et al. ..................... 702/168 |
| 7,647,706 B2 | 1/2010 | Jordil et al. |
| 2005/0213108 A1 | 9/2005 | McMurtry et al. |
| 2007/0056176 A1* | 3/2007 | Matsumiya et al. ............ 33/551 |
| 2008/0065341 A1* | 3/2008 | Ishikawa et al. ................ 702/95 |

(Continued)

FOREIGN PATENT DOCUMENTS

| | | |
|---|---|---|
| EP | 1983297 | 10/2008 |
| JP | 2008-241420 | 10/2008 |

OTHER PUBLICATIONS

Search report from E.P.O., mail date is Sep. 18, 2013.

*Primary Examiner* — Darrin Dunn
(74) *Attorney, Agent, or Firm* — Greenblum & Bernstein, P.L.C.

(57) ABSTRACT

A shape measuring apparatus includes: a probe having a stylus tip; a movable mechanism configured to move the stylus tip; an information acquiring unit configured to acquire design information of a workpiece; a path setting unit configured to set a path of the stylus tip; a path component calculating section configured to calculate a path velocity vector; a push direction component calculating section configured to detect a deflection, and calculate a push correction vector; a locus correction component calculating section configured to detect an amount and a direction of locus deviation of the probe from the path, and calculate a locus correction vector; a velocity synthesizing section configured to calculate a velocity synthesis vector by combining the path velocity vector, the push correction vector, and the locus correction vector; and a drive control unit configured to move the probe according to the velocity synthesis vector.

4 Claims, 8 Drawing Sheets

(56) References Cited

U.S. PATENT DOCUMENTS

| | | | |
|---|---|---|---|
| 2008/0236259 A1* | 10/2008 | Kurenuma et al. | 73/105 |
| 2008/0236260 A1 | 10/2008 | Noda et al. | |
| 2008/0257023 A1 | 10/2008 | Jordil et al. | |
| 2009/0217426 A1* | 8/2009 | Noda et al. | 850/21 |
| 2010/0174504 A1* | 7/2010 | Nakagawa et al. | 702/95 |
| 2011/0066400 A1* | 3/2011 | Noda et al. | 702/168 |
| 2011/0270562 A1* | 11/2011 | Ito et al. | 702/94 |

\* cited by examiner

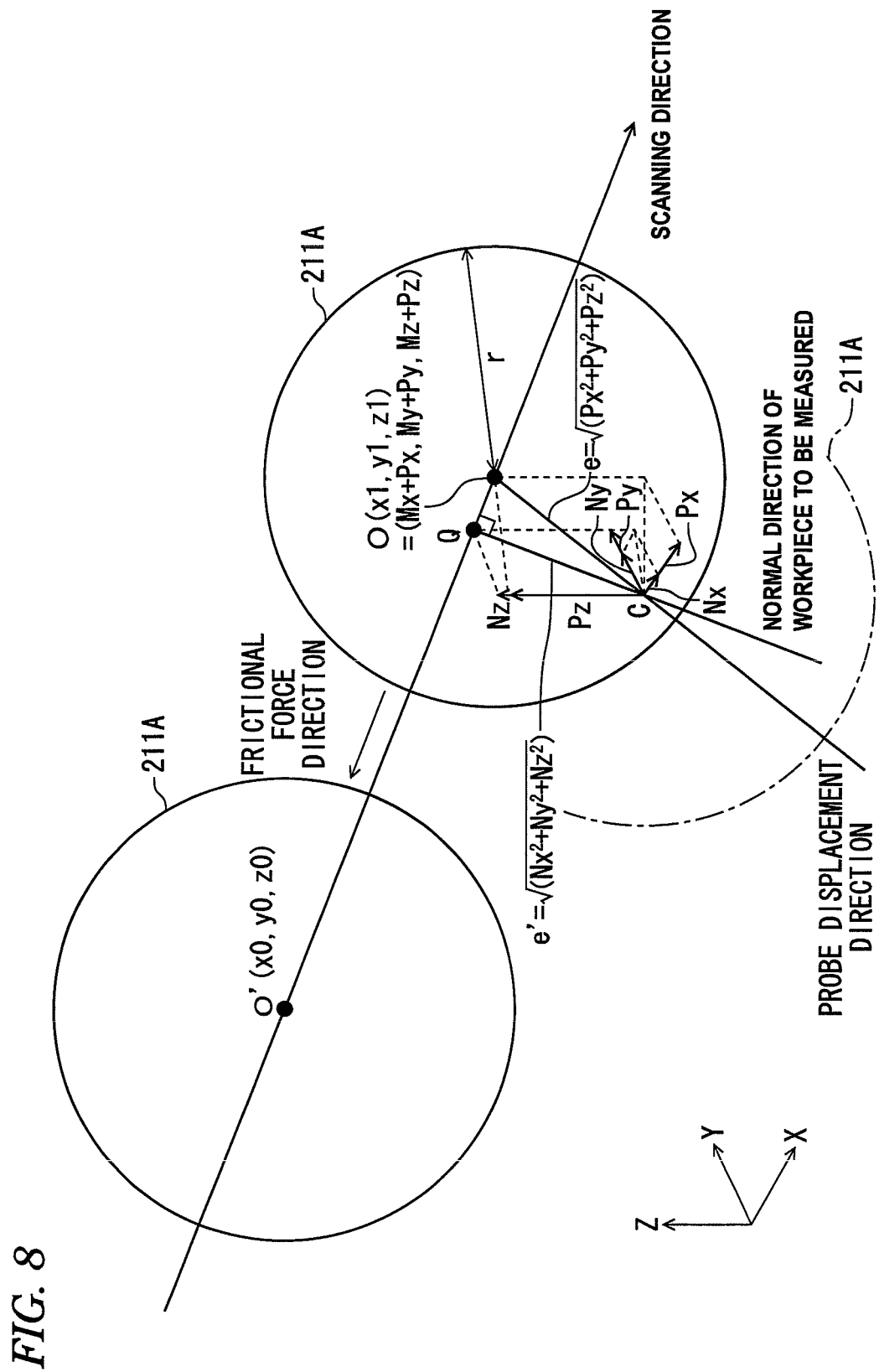

SHAPE MEASURING APPARATUS

CROSS-REFERENCE TO RELATED APPLICATION(S)

This application is based upon and claims the benefit of priority from Japanese Patent Application No. 2012-113596, filed on May 17, 2012, the entire contents of which are incorporated herein by reference.

BACKGROUND

1. Field of the Invention

The present invention relates to a shape measuring apparatus.

2. Description of the Related Art

Shape measuring apparatuses are known which are equipped with a probe having a stylus tip for measurement of a workpiece to be measured, a movable mechanism for moving the probe, and a control device for controlling the movable mechanism and which measure the shape of a workpiece to be measured by moving the stylus tip so that it scans the surface of the workpiece to be measured (refer to JP-A-2008-241420, for example).

In the apparatus disclosed in JP-A-2008-241420, movement velocities of a probe are calculated by converting design values (NURBS (non-uniform rational B-spline) data) which are based on CAD data or the like into PCCs (parametric cubic curves) and calculating velocity curves from divisional PCCs obtained by dividing the PCCs. The probe is moved based on the movement velocities calculated based on the design values, whereby a stylus tip is moved so as to scan the surface of a workpiece to be measured (nominal scanning: scanning known paths generated based on the design values).

Shape measuring apparatuses of another type are known in which design value data are not used. Instead, an amount of the push of a probe toward a workpiece to be measured is detected and the probe is moved so as to scan the surface of the workpiece to be measured so that the probe deflection becomes equal to a prescribed reference value (autonomous scanning: scanning unknown paths).

Incidentally, the nominal scanning as described in JP-A-2008-241420 enables a high-speed shape measurement because a stylus tip is moved along a path that is set according to design values. However, no consideration is given to a variation of the amount of the push of a probe toward a workpiece to be measured. Therefore, for example, when a stylus tip arrives at a recess that should not exist, in a design, in the surface of a workpiece to be measured, an event may generate that the deflection decreases and the stylus tip separates from the surface of the workpiece to be measured. This means a problem that the measurement accuracy is lowered.

On the other hand, in the autonomous scanning, since a probe is moved so that the deflection is kept constant, the probability that a stylus tip separates from the surface of a workpiece to be measured and hence a high-accuracy shape measurement is enabled. However, to accommodate, for example, workpieces to be measured having rapidly varying radii of curvature, it is necessary to set the probe movement speed low. This means a problem of a long measurement time.

SUMMARY

A workpiece of the present invention is to provide a shape measuring apparatus which is of high accuracy and enables high-speed shape measurements.

According to an aspect of the invention, there is provided a shape measuring apparatus including: a probe having a stylus tip at the tip; a movable mechanism configured to causing the stylus tip to move so as to scan a surface of a workpiece to be measured; an information acquiring unit configured to acquire design information of the workpiece; a path setting unit configured to set a path along which to move the stylus tip based on the design information; a path component calculating section configured to calculate a path velocity vector which is a velocity component vector of the probe along the path; a push direction component calculating section configured to detect a deflection of the probe toward the workpiece, and calculate a push correction vector which is a velocity component vector to be used for correcting the deflection to a prescribed reference deflection; a locus correction component calculating section configured to detect an amount and a direction of locus deviation of the probe from the path, and calculate a locus correction vector which is a velocity component vector to be used for returning the probe position to the path based on a current position of the probe and the path; a velocity synthesizing section configured to calculate a velocity synthesis vector by combining the path velocity vector, the push correction vector, and the locus correction vector; and a drive control unit configured to move the probe according to the velocity synthesis vector.

In the invention, the path setting unit sets a path along which to move the stylus tip based on design information acquired by the information acquiring unit. The velocity synthesizing section calculates a velocity synthesis vector by combining a path velocity vector calculated by the path component calculating section, a push correction vector calculated by the push direction component calculating section, and a locus correction vector calculated by the locus correction component calculating section. The drive control unit drives the probe according to the thus-calculated velocity synthesis vector.

Thus, the invention makes it possible to perform a high-speed shape measurement by moving the stylus tip along a set path. In addition, since a drive control is made so that the deflection is made equal to the reference deflection using the push correction vector, such a problem as separation of the stylus tip from a workpiece to be measure can be avoided even in the case where the surface of the workpiece has manufacturing errors etc. A high-accuracy shape measurement is thereby enabled.

The velocity synthesizing section may correct the path velocity vector by multiplying the path velocity vector by a path direction gain so as to set the path direction gain smaller when the difference between the deflection and the reference deflection is larger than a prescribed first threshold value and the locus deviation amount is larger than a prescribed second threshold value than when at least one of a condition that the difference is smaller than the first threshold value and a condition that the locus deviation amount is smaller than the second threshold value is satisfied, and calculate a velocity synthesis vector based on a corrected path velocity vector, the push correction vector, and the locus correction vector.

If the difference between the deflection and the reference deflection is larger than the first threshold value and the locus deviation amount is larger than the second threshold value, the current position of the probe may be deviated from the set path to a large extent. In this case, if the speed in the scanning direction is large, correct measurement values may not be obtained for the set path. In view of this, in the invention, the speed in the scanning direction can be decreased by lowering the path direction gain and hence the probe position can be returned to the path quickly. A high-accuracy measurement for a set path is thereby enabled.

The velocity synthesizing section may correct the push correction vector by multiplying the push correction vector by a push direction correction gain so as to set the push direction correction gain smaller when the difference between the deflection and the reference deflection is smaller than or equal to a prescribed first threshold value than when the difference is larger than the first threshold value, and calculate a velocity synthesis vector based on the path velocity vector, a corrected push correction vector, and the locus correction vector.

In the invention, a smaller push direction correction gain is used when the difference between the deflection and the reference deflection is smaller than or equal to the first threshold value than when the difference is larger than the first threshold value. This makes it possible to decrease the deflection correction amount and to thereby make the deflection equal to the reference deflection accurately.

The velocity synthesizing section may correct the locus correction vector by multiplying the locus correction vector by a locus correction gain so as to set the locus correction gain smaller when the locus deviation amount is smaller than or equal to a prescribed second threshold value than when the locus deviation amount is larger than the second threshold value, and calculate a velocity synthesis vector based on the path velocity vector, the push correction vector, and a corrected locus correction vector.

In the invention, a smaller locus correction gain is used when the locus deviation amount is smaller than or equal to the second threshold value than when the locus deviation amount is larger than the second threshold value. This makes it possible to prevent rapid increase of the locus correction amount when the locus deviation amount is small and the current position of the probe is close to the path. Thus, the probe can be moved (returned) to the path accurately.

The push direction component calculating section may calculate a push correction vector using a normal direction of the workpiece at a position where the stylus tip is in contact with the surface of the workpiece as a push direction.

When the stylus tip is moved so as to scan the surface of a workpiece to be measured, there may generate an event that a displacement direction of the probe does not coincide with a normal direction of the workpiece due to friction between the stylus tip and the workpiece. Therefore, if a push correction vector is calculated using a probe displacement direction as a push direction, the probe may be moved in an unintended direction, resulting in reduction in measurement accuracy. In view of this, in the invention, a normal direction of the workpiece at a position where the stylus tip is in contact with the surface of the workpiece is employed as a push direction. Therefore, a push correction vector can be calculated with high accuracy using a normal direction of the workpiece as a push direction, whereby the measurement accuracy can be increased.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 8 illustrates a method for calculating a push correction vector in a case that a frictional force acts on the stylus tip when it is moved in a scanning direction.

DETAILED DESCRIPTION OF THE INVENTION

Figure 1:
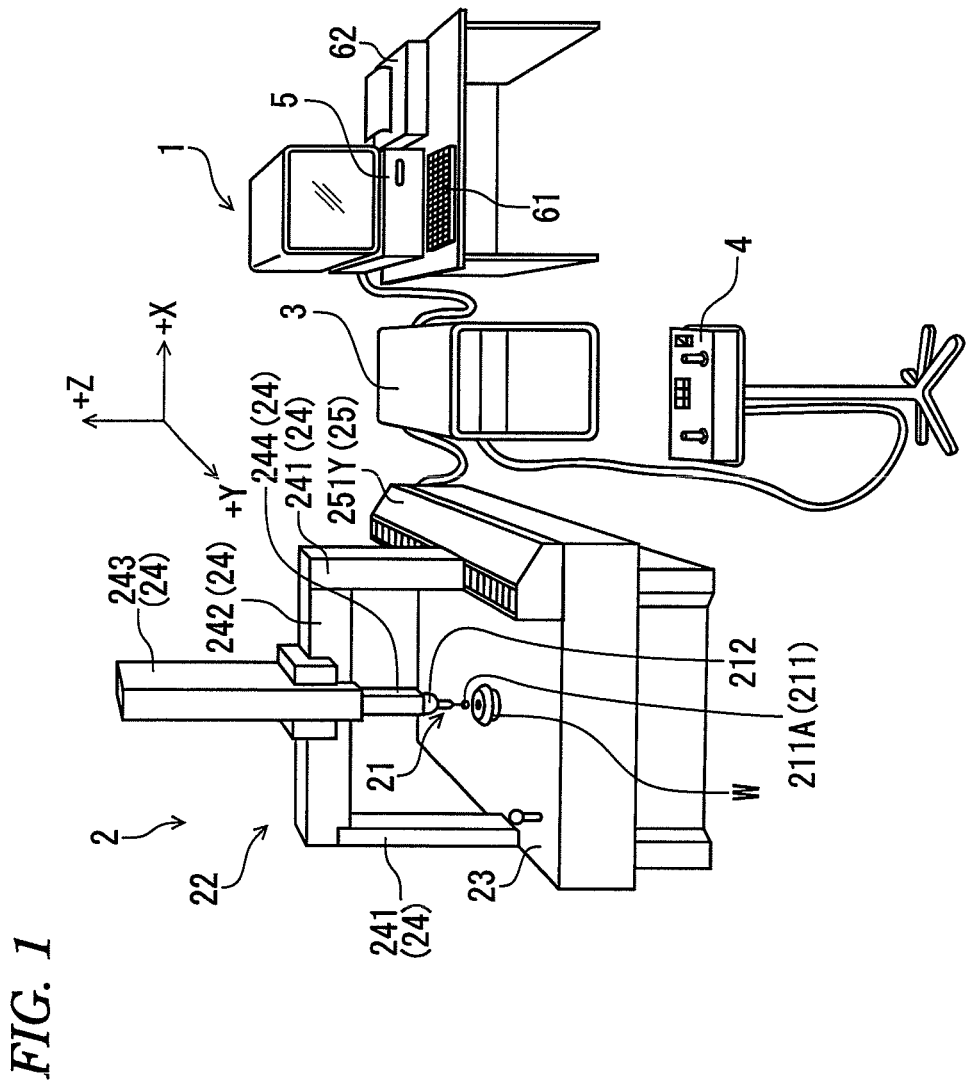
FIG. 1 schematically shows the whole of a coordinate measuring machine which is a shape measuring apparatus according to an embodiment of the present invention.
Figure 2:
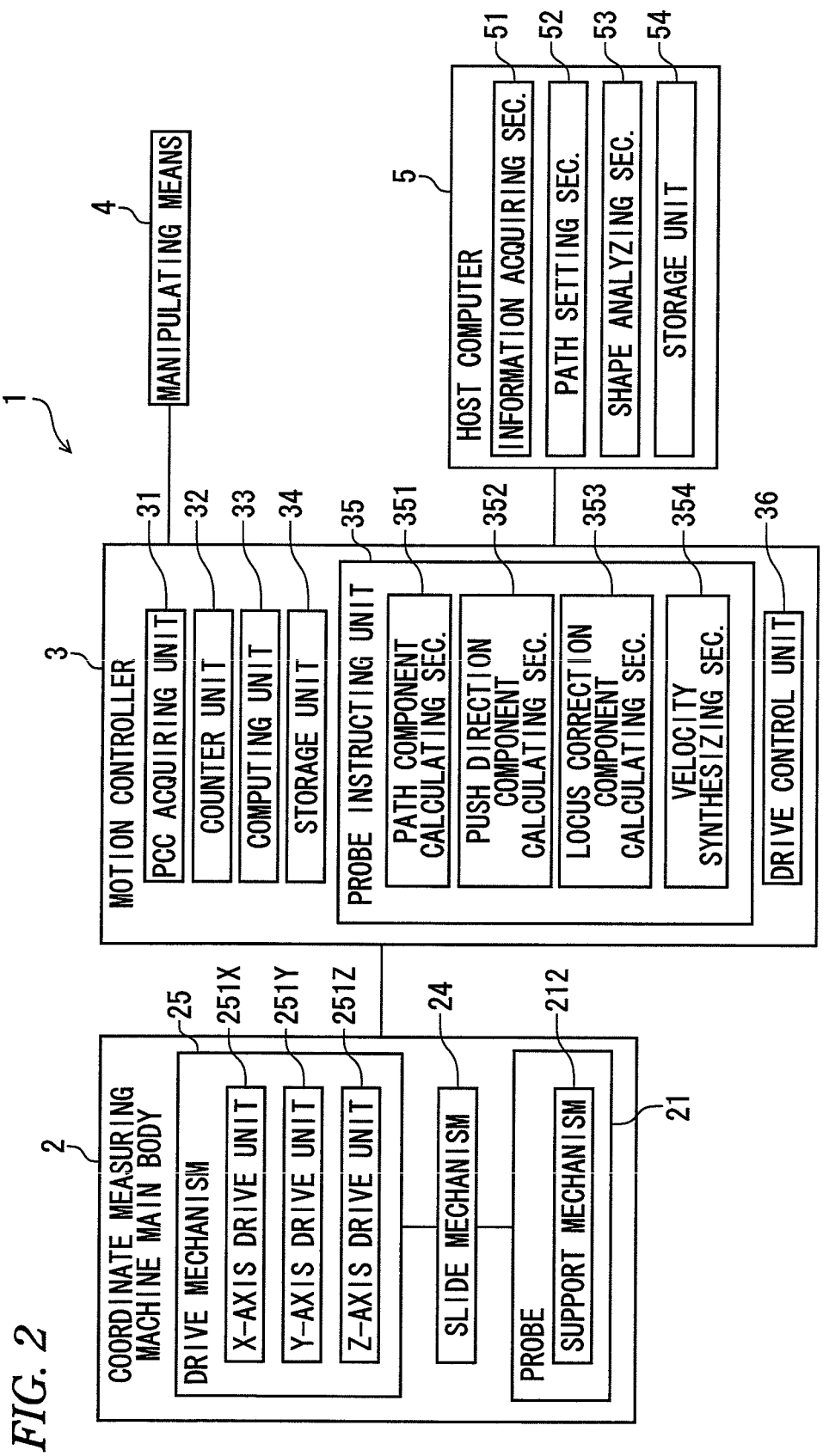
FIG. 2 is a block diagram showing a rough configuration of the coordinate measuring machine according to the embodiment.

An embodiment of the present invention will be hereinafter described with reference to the drawings. FIG. 1 schematically shows the whole of a coordinate measuring machine 1 which is a shape measuring apparatus according to the embodiment of the invention. FIG. 2 is a block diagram showing a rough configuration of the coordinate measuring machine 1.

In FIG. 1, the +Z-axis direction is the upward direction and the X axis and the Y axis are two axes that are perpendicular to the Z axis. The X axis, the Y axis, and the Z axis constitute a machine coordinate system. The same applies to the other drawings.

<Configuration of Coordinate Measuring Machine Main Body>

As shown in FIG. 1, a coordinate measuring machine main body 2 is equipped with a probe 21 having a spherical stylus tip 211A for measurement of a workpiece to be measured, a movable mechanism 22, and a surface table 23 on which the movable mechanism 22 is disposed.

As shown in FIG. 1, the probe 21 is equipped with a stylus 211 having the stylus tip 211A at its tip (at its end in the −Z-axis direction) and a support mechanism 212 which supports the stylus 211 from its proximal side (located at its end in the +Z-axis direction).

The support mechanism 212 supports the stylus 211 so as to position it at a prescribed position by urging it in each of the X-axis, Y-axis, and Z-axis directions. When receiving external force (i.e., the stylus tip 211A comes into contact with a workpiece to be measured), the support mechanism 212 renders the stylus 211 movable in a prescribed range in each of the X-axis, Y-axis, and Z-axis directions.

Although not shown in a specific manner, the support mechanism 212 is equipped with probe sensors for detecting positions of the stylus 211 in the X-axis, Y-axis, and Z-axis directions, respectively. Each probe sensor is a position sensor which outputs a pulse signal corresponding to a movement distance in the corresponding one of the X-axis, Y-axis, and Z-axis directions.

As shown in FIGS. 1 and 2, the movable mechanism 22 is equipped with a slide mechanism 24 which holds the probe 21 and enables its slide movement and a drive mechanism 25 for moving the probe 21 by driving the slide mechanism 24.

As shown in FIG. 1, the slide mechanism 24 is equipped with two columns 241 which is disposed so as to extend in the +Z-axis direction from two respective end positions, in the X-axis direction, of the surface table 23 and to be slidable in the Y-axis direction, a beam 242 which are supported by the columns 241 so as to expend in the X-axis direction, a pipe-shaped slider 243 which extends in the Z-axis direction and is disposed so as to be slidable on the beam 242 in the X-axis direction, and a ram 244 which is disposed so as to be slidable inside the slider 243 in the Z-axis direction.

As shown in FIGS. 1 and 2, the drive mechanism 25 is equipped with a Y-axis drive unit 251Y which supports the +X-axis-side column 241 and causes it to slide in the Y-axis direction, an X-axis drive unit 251X (see FIG. 2) which causes the slider 243 to slide on the beam 242 in the X-axis direction, and a Z-axis drive unit 251Z (see FIG. 2) which causes the ram 244 to slide inside the slider 243 in the Z-axis direction.

Although not shown specifically in any drawing, a scale sensor for detecting the position of the slider 243, the columns 241, or the ram 244 in the corresponding axis direction is provided in each of the X-axis drive unit 251X, the Y-axis drive unit 251Y, and the Z-axis drive unit 251Z. Each scale sensor is a position sensor which outputs a pulse signal corresponding to a movement distance of the slider 243, the columns 241, or the ram 244.

<Configuration of Motion Controller>

As shown in FIG. 2, a motion controller 3 is equipped with a PCC acquiring unit 31, a counter unit 32, a computing unit 33, a storage unit 34, a probe instructing unit 35, and a drive control unit 36.

The PCC acquiring unit 31 acquires, from a host computer 5, PCC commands (PCC data) to be used for driving the probe 21.

The counter unit 32 measures movement distances of the slide mechanism 24 by counting pulse signals that are output from the above-mentioned scale sensors, respectively, and measures movement distances of the stylus 211 by counting pulse signals that are output from the above-mentioned probe sensors, respectively.

The computing unit 33 calculates a position PP of the stylus tip 211A (hereinafter referred to as a probe position PP) based on the movement distances of the slide mechanism 24 and the stylus 211 measured by the counter unit 32. The computing unit 33 stores the calculated probe position PP in the storage unit 34.

Furthermore, the computing unit 33 calculates a deflection (the absolute value of a vector $\vec{Ep}$) of the stylus tip 211A according to the scanning Equation (1) based on the movement distances of the stylus 211 (detection values (Px, Py, Pz) of the respective probe sensors) measured by the counter unit 32:

[Formula 1]

$$|\vec{Ep}|=\sqrt{Px^2+Py^2+Pz^2} \quad (1)$$

The probe instructing unit 35 calculates probe instruction values (a velocity synthesis vector) to be used for moving the stylus tip 211A so that it scans the surface of a workpiece W to be measured in a state that the stylus tip 211A is pushed toward the workpiece W based on the probe position PP and the deflection calculated by the computing unit 33 and the PCC data acquired by the PCC acquiring unit 31.

More specifically, this is done in the scanning manner. The probe instructing unit 35 is equipped with a path component calculating section 351, a push direction component calculating section 352, a locus correction component calculating section 353, and a velocity synthesizing section 354.

The path component calculating section 351 calculates velocity component vectors along a path of the probe 21 that is based on the PCC data (path velocity vectors).

Based on a deflection calculated by the computing unit 33, the push direction component calculating section 352 calculates a velocity component vector in the push direction (push correction vector) to be used for returning the deflection to a preset, reference deflection.

The locus correction component calculating section 353 calculates a velocity component vector (locus correction vector) to be used for returning the stylus tip 211A to the path based on a current position of the stylus tip 211A and the path of path information.

The velocity synthesizing section 354 calculates a velocity synthesis vector which is a synthetic vector of the path velocity vector, the push correction vector, and the locus correction vector, and outputs the calculated velocity synthesis vector to the drive control unit 36.

The details of a process executed by the probe instructing unit 35 will be described later. The drive control unit 36 controls the drive mechanism 25 to move the probe 21 based on probe instruction values that are calculated by the probe instructing unit 35.

<Configuration of Host Computer>

The host computer 5, which is equipped with a CPU (central processing unit), a memory, etc., controls the coordinate measuring machine main body 2 by giving prescribed instructions to the motion controller 3. As shown in FIG. 2, the host computer 5 is equipped with an information acquiring section 51, a path setting section 52, a shape analyzing section 53, and a storage unit 54.

The information acquiring section 51 acquires design information (CAD data, NURBS data, etc.) of the workpiece W to be measured from a CAD system (not shown).

The path setting section 52 sets a movement path of the probe 21 (PCC data) based on the design information acquired by the information acquiring section 51.

The shape analyzing section 53 calculates surface shape data of the workpiece W to be measured based on measurement data that are output from the motion controller 3, and performs a shape analysis for determining errors, distortions, etc. in the calculated surface shape data of the workpiece W.

The storage unit 54 is stored with data to be used by the host computer 5, design information relating to the shape of the workpiece W, and other information.

<Operation of Coordinate Measuring Machine>

Figure 3:
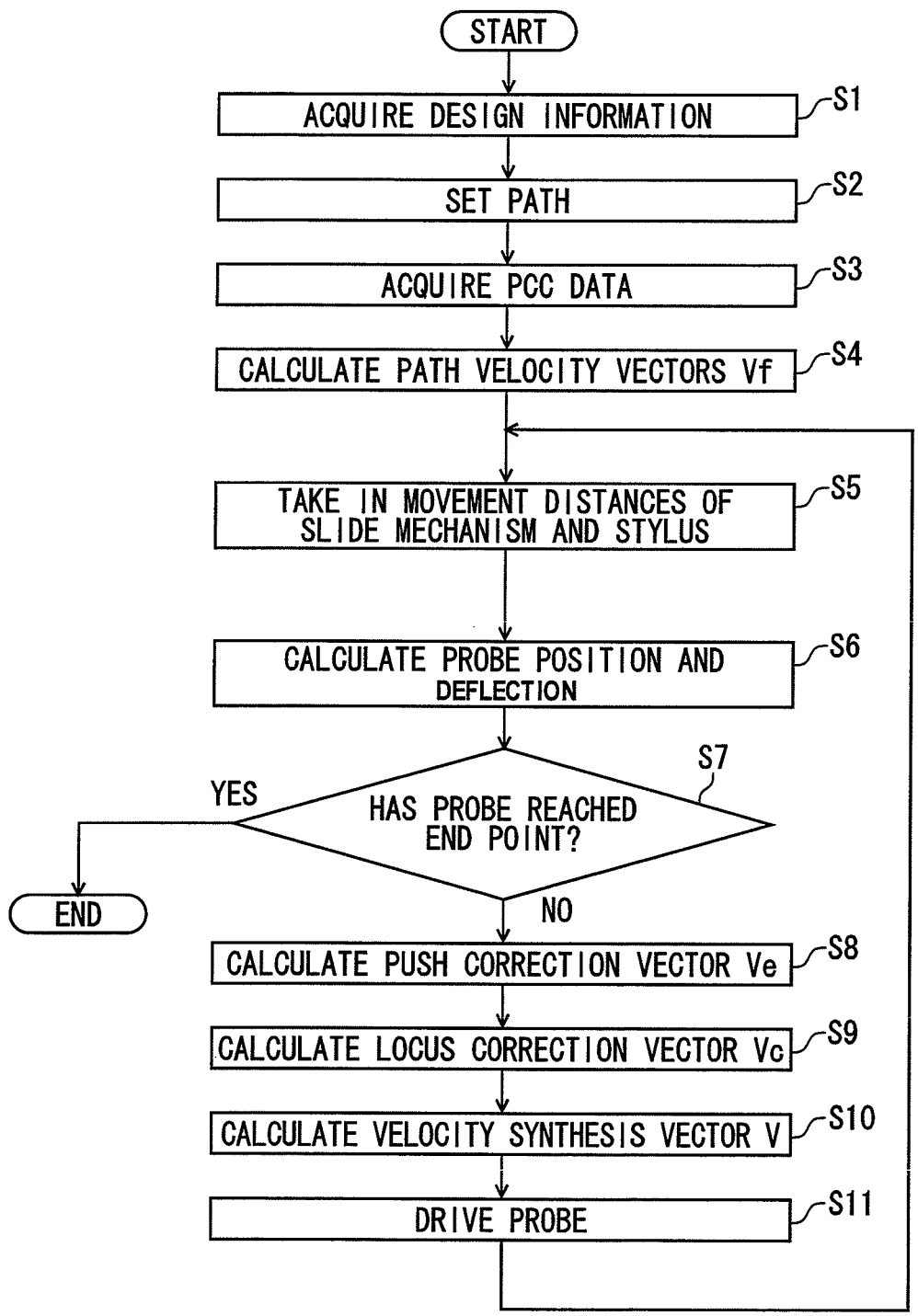
FIG. 3 is a flowchart showing a method for calculating a velocity synthesis vector for a probe used in the embodiment.
Figure 4:
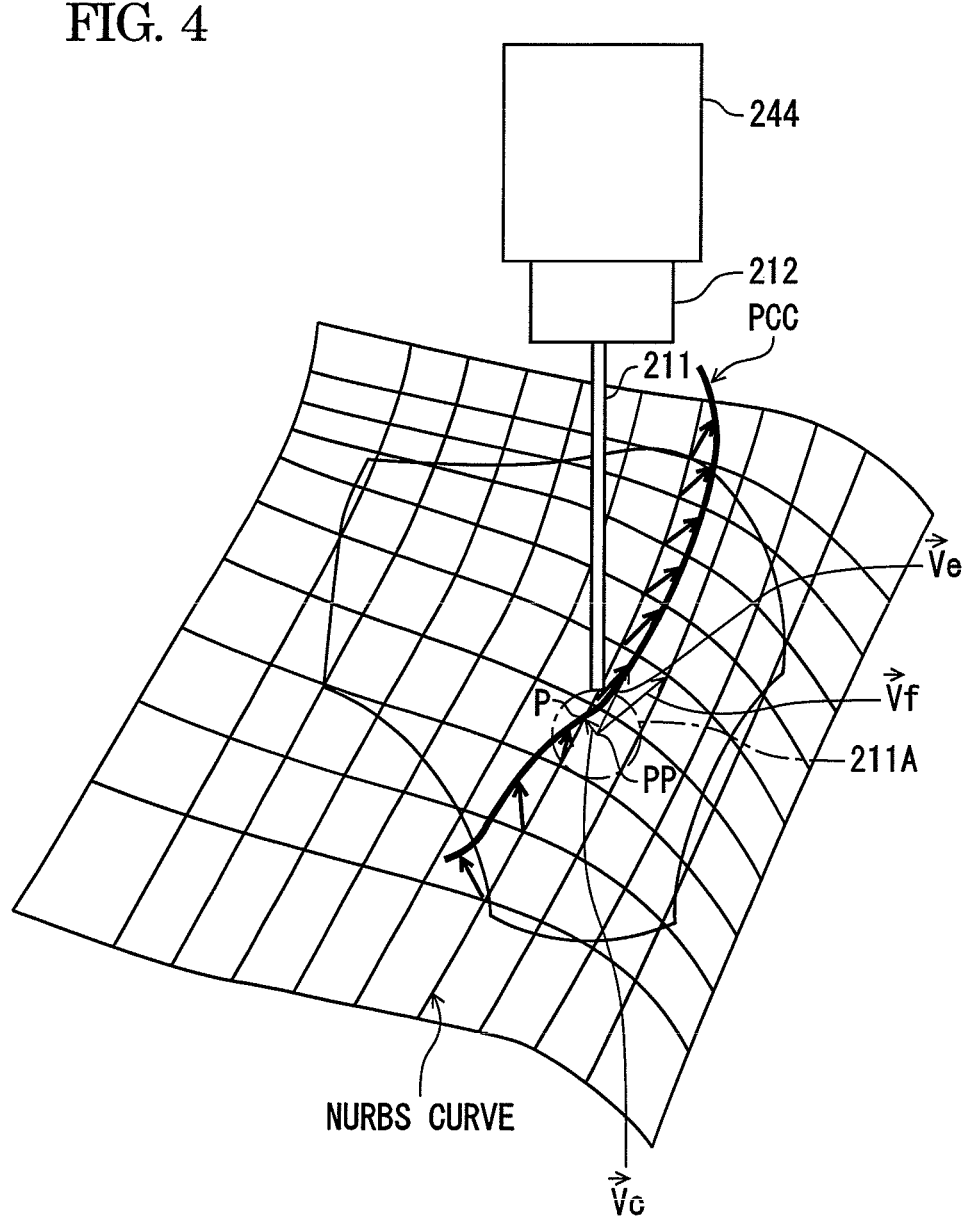
FIG. 4 shows a locus of a stylus tip and velocity component vectors relating to the stylus tip.

Next, a description will be made of how the above-described coordinate measuring machine 1 operates. FIG. 3 is a flowchart showing a method for calculating a velocity synthesis vector for the probe 21 in moving the probe 21 so that it scans the surface of the workpiece W to be measured. FIG. 4 shows a locus of the stylus tip and velocity component vectors relating to the stylus tip.

In the embodiment, to measure a surface shape of the workpiece W to be measured, at step S1, the information acquiring section 51 of the host computer 4 acquires NURBS data (design data) from the CAD system.

Figure 5:
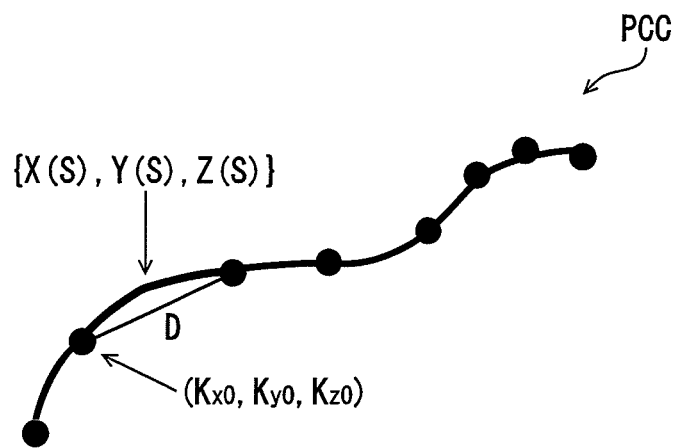
FIG. 5 shows an example PCC.

At step S2, the path setting section 52 converts the acquired NURBS data into point group data and then converts the point group data into PCCs by offsetting curves of the NURBS data in the normal direction. That is, the path setting section 52 sets a movement path of the probe 21 in a scanning measurement. FIG. 5 shows an example PCC.

The offset amount is defined as (radius of stylus tip 211A)−(reference deflection). Each PCC is divided into segments (divisional PCCs) by plural points. Now, let the coordinates of a start point of an arbitrary divisional PCC be represented by ($K_{X0}$, $K_{Y0}$, $K_{Z0}$) and the straight-line length of the divisional PCC be represented by D. Then, the coordinates (X(S), Y(S), Z(S)) of an arbitrary point of the divisional PCC are given by the scanning Equations (2):

[Formula 2]

$$X(S) = K_{X3} \times S^3 + K_{X2} \times S^2 + K_{X1} \times S + K_{X0}$$

$$Y(S) = K_{Y3} \times S^3 + K_{Y2} \times S^2 + K_{Y1} \times S + K_{Y0}$$

$$Z(S) = K_{Z3} \times S^3 + K_{Z2} \times S^2 + K_{Z1} \times S + K_{Z0} \qquad (2)$$

where S is a variable that varies in an interval [0, D] and $K_{X3}$ to $K_{X0}$, $K_{Y3}$ to $K_{Y0}$, and $K_{Z3}$ to $K_{Z0}$ are constants.

At step S3, the PCC acquiring section 351 of the motion controller 3 acquires the PCC data (PCC commands) from the host computer 5. More specifically, the PCC acquiring section 351 acquires sets of values of $K_{X3}$ to $K_{X0}$, $K_{Y3}$ to $K_{Y0}$, and $K_{Z3}$ to $K_{Z0}$ and D in the above Equations (2) from the host computer 5.

At step S4, the path component calculating section 351 calculates path velocity vectors $\vec{Vf}$ based on the PCC data ($K_{X3}$ to $K_{X0}$, $K_{Y3}$ to $K_{Y0}$, and $K_{Z3}$ to $K_{Z0}$ and D) and curvature values of the divisional PCCs. Where each FCC is divided into M divisional PCCs, the path component calculating section 351 generates path velocity vectors $\vec{Vf}$ for the M respective divisional PCCs(i) (i=1 to M).

At step S5, the computing unit 33 takes in movement distances of the slide mechanism 24 and the stylus 211 measured by the counter unit 32 at a prescribed sampling interval, for example.

At step S6, based on the received movement distances of the slide mechanism 24 and the stylus 211, the computing unit 33 calculates a probe position PP and also calculates a deflection of the stylus tip 211A according to Equation (1).

At step S7, the probe instructing section 35 judges whether or not the calculated probe position PP is an end point of the path. If it is judged at step S7 that the calculated probe position PP is not an end point, the probe instructing section 35 calculates a drive velocity for the probe 21 and drives the probe 21 at the calculated drive velocity.

To this end, first, at step S8, the push direction component calculating section 352 calculates a push correction vector $\vec{Ve}$ to be used for correcting the deflection toward the workpiece W to be measured to the preset reference deflection. More specifically, the push direction component calculating section 352 calculates a push correction vector $\vec{Ve}$ according to the scanning Equation (3):

[Formula 3]

$$\vec{Ve} = K(|\vec{EpEp}| - E_0)\vec{e}_u \qquad (3)$$

In Equation (3), K is a constant and $E_0$ is the reference deflection which is a preset value. The absolute value of the vector $\vec{Ep}$ is the deflection of the probe 21 calculated at step S6, and the vector $\vec{e}_u$ is a unit vector in the push direction. In the embodiment, a unit vector in the displacement direction of the probe 21 is calculated as the vector $\vec{e}_u$.

At step S9, the locus correction component calculating section 353 calculates a locus correction vector $\vec{Vc}$ to be used in the case where the probe position PP is deviated from the path, based on the probe position PP and the path that was set at step S2.

More specifically, the locus correction component calculating section 353 calculates a locus correction vector $\vec{Vc}$ by employing, as a locus deviation, the distance between the probe position PP and a point P which is the foot of the perpendicular from the probe position PP to the path and employing, as a locus correcting direction, the direction from the probe position PP to the point P.

At step S10, the velocity synthesizing section 354 calculates a velocity synthesis vector $\vec{V}$ by combining the path velocity vector $\vec{Vf}$, the push correction vector $\vec{Ve}$, and the locus correction vector $\vec{Vc}$ which were calculated at steps S4, S8, and S9, respectively. A velocity vector for the divisional PCC corresponding to the probe position PP calculated at step S6 is employed as the path velocity vector $\vec{Vf}$. If the probe position PP is deviated from the path, a velocity vector for the divisional PCC to which the point P (i.e., the foot of the perpendicular from the probe position PP to the path) belongs.

The velocity synthesizing section 354 calculates a velocity synthesis vector $\vec{V}$ according to the scanning Equation (4):

[Formula 4]

$$\vec{V} = Gf \times \vec{Vf} + Ge \times \vec{Ve} + Gc \times \vec{Vc} \qquad (4)$$

In Equation (4), Gf, Ge, and Gc are a scan drive gain (path velocity gain), a push direction correction gain, and a locus correction gain, respectively.

The scan drive gain Gf is determined using a function $f_1(C, E)$ where E is the difference between the deflection (the absolute value of the vector $\vec{Ep}$) calculated at step S6 and the preset reference deflection $E_0$ and C is the locus deviation calculated at step S8. The function $f_1(C, E)$ has a smaller value when the difference E is larger than a prescribed first threshold value and the locus deviation C is larger than a prescribed second threshold value than when at least one of a condition that the difference E is smaller than or equal to the first threshold value and a condition that the locus deviation C is smaller than or equal to the second threshold value is satisfied.

The push direction correction gain Ge is determined using a function $f_2(E)$. The function $f_2(E)$ has a smaller value when the difference E is smaller than or equal to the first threshold value than when the difference E is larger than the first threshold value.

The locus correction gain Gc is determined using a function $f_3(C)$. The function $f_3(C)$ has a smaller value when the locus deviation C is smaller than or equal to the second threshold value than when the locus deviation C is larger than the second threshold value.

The velocity synthesizing section 354 outputs the calculated velocity synthesis vector V to the drive control unit 36 as probe instruction values. At step S11, the probe 21 is driven according to the velocity synthesis vector V. Then, the process returns to step S5. Steps S5-S11 are executed repeatedly until the probe position PP reaches the end point while a probe position PP and a deflection are calculated at the sampling intervals.

If the probe position PP reaches the end point, an affirmative judgment is made at step S7 and the measuring process is finished.

Advantages of Embodiment

In the coordinate measuring machine 1 according to the embodiment, the information acquiring section 51 acquires design information from the CAD system (not shown) and the path setting section 52 sets a movement path of the probe 21 based on the acquired design information. The path component calculating section 351 calculates path velocity vectors $\vec{Vf}$ (velocity component vectors along scanning directions) based on the thus-set path. Based on a deflection of the stylus tip 211A calculated by the computing unit 33, the push direction component calculating section 352 calculates a push correction vector $\vec{Ve}$ to be used for returning the deflection to a preset, reference deflection. Based on a probe position PP and the set path, the locus correction component calculating section 353 calculates a locus correction vector $\vec{Vc}$ to be used for returning the probe position PP to the path.

The velocity synthesizing section 354 calculates, according to Equation (4), a velocity synthesis vector $\vec{V}$ which is a synthetic vector of the path velocity vector $\vec{Vf}$, the push correction vector $\vec{Ve}$, and the locus correction vector $\vec{Vc}$, and outputs the calculated velocity synthesis vector $\vec{Vf}$ to the drive control unit 36 as probe instruction values for the purpose of driving of the probe 21.

With the above configuration, according to the embodiment, the probe 21 is driven so as to scan a path that is set based on design information of a workpiece W to be measured. Therefore, the probe 21 can be driven smoothly even if the radius or curvature varies to a large extent at a probe position PP. This enables a high-speed shape measurement.

Since a drive control is performed so that the deflection of the stylus tip 211A is kept equal to the reference deflection, the stylus tip 211A can be moved so as to scan the surface of a workpiece W to be measured even if a shape difference due to a manufacturing error, for example, exists between a real shape and design information of the workpiece W. That is, there does not generate a problem that the stylus tip 211A separates from the workpiece W, as a result of which a high-accuracy shape measurement is enabled.

As such, the embodiment makes it possible to perform both of a high-speed shape measurement as in the nominal scanning and a high-accuracy shape measurement as in the autonomous scanning.

In the embodiment, the velocity synthesizing section 354 calculates a velocity synthesis vector $\vec{V}$ using the path velocity vector $\vec{Vf}$, the push correction vector $\vec{Ve}$, the locus correction vector $\vec{Vc}$, the scan drive gain Gf, the push direction correction gain Ge, and the a locus correction gain Gc (see Equation (4)).

In doing so, the velocity synthesizing section 354 determines the scan drive gain Gf using the function $f_1(C, E)$ which has a smaller value when the difference E between the deflection (the absolute value of the vector $\vec{Ep}$) and the reference deflection $E_0$ is larger than the first threshold value and the locus deviation C is larger than the second threshold value than when the difference E is smaller than or equal to the first threshold value or the locus deviation C is smaller than or equal to the second threshold value.

As a result, the absolute value of the velocity component vector in the scanning direction can be reduced when the difference E and the locus deviation C are large and hence the probe position PP may be deviated from the path to a large extent. Therefore, when the probe position PP is deviated from the path, the probe position can be returned to the path by reducing the movement distance in the scanning direction, whereby a high-accuracy shape measurement along the path is enabled.

To determine the push direction correction gain Ge, the velocity synthesizing section 354 uses the function $f_2(E)$ which has a smaller value when the difference E is smaller than or equal to the first threshold value than, when the difference E is larger than the first threshold value.

As a result, the absolute value of the velocity component vector in the push direction can be reduced when the deflection is close to the reference deflection and hence it does not require a large correction. Therefore, an excessive variation of the deflection can be prevented and the deflection of the stylus tip 211A can be made equal to the prescribed reference deflection accurately.

Furthermore, to determine the locus correction gain Gc, the velocity synthesizing section 354 uses the function $f_3(C)$ which has a smaller value when the locus deviation C is smaller than or equal to the second threshold value than when the locus deviation C is larger than the second threshold value.

As a result, the absolute value of the velocity component vector in the locus correcting direction can be reduced when the locus deviation is slight. Therefore, there does not generate a problem that the probe 21 makes a large movement in the locus correcting direction, whereby the stylus tip 211A can be returned to the path with high accuracy.

<Modifications>

The invention is not limited to the above embodiment and encompasses modifications, improvements, etc. with which the workpiece of the invention can be attained.

Although in the above embodiment the push direction component calculating section 352 calculates a push correction vector $\vec{Ve}$ with a displacement direction of the probe 21 employed as a push direction, the invention is not limited to such a case.

For example, when the probe 21 is moved so as to scan the surface of a workpiece W to be measured, there may generate an event that the displacement direction of the probe 21 is deviated from the normal direction of the workpiece W due to friction between the stylus tip 211A and the workpiece W.

Figure 6:
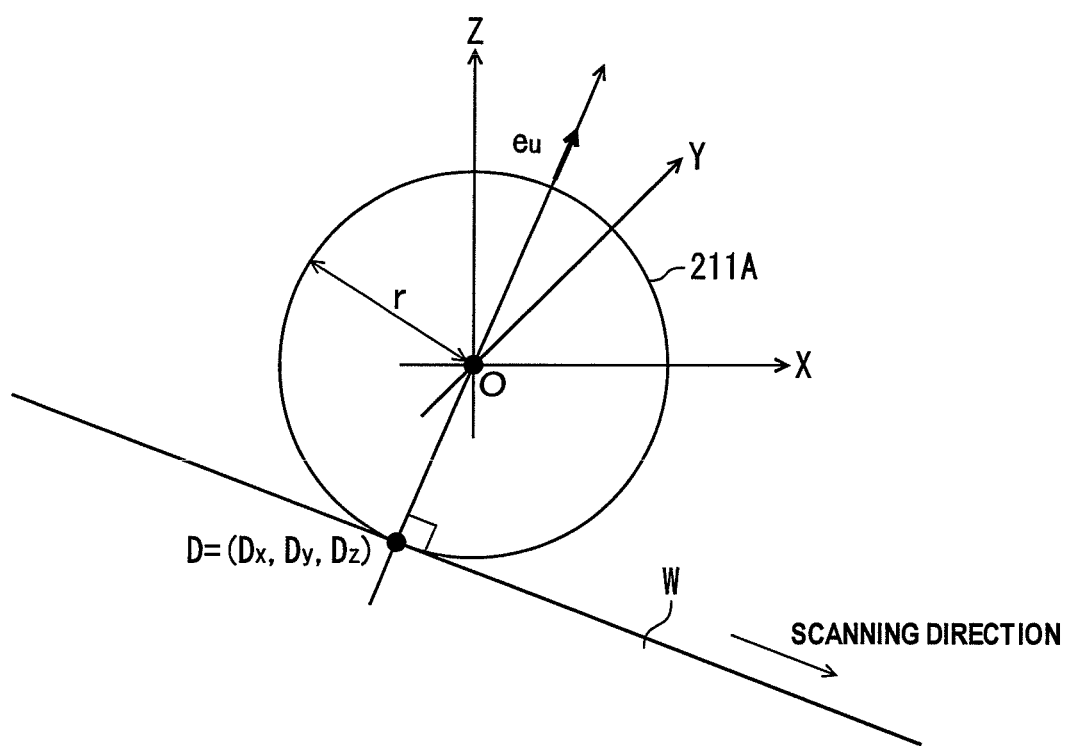
FIG. 6 illustrates a scanning measurement model without friction.
Figure 7:
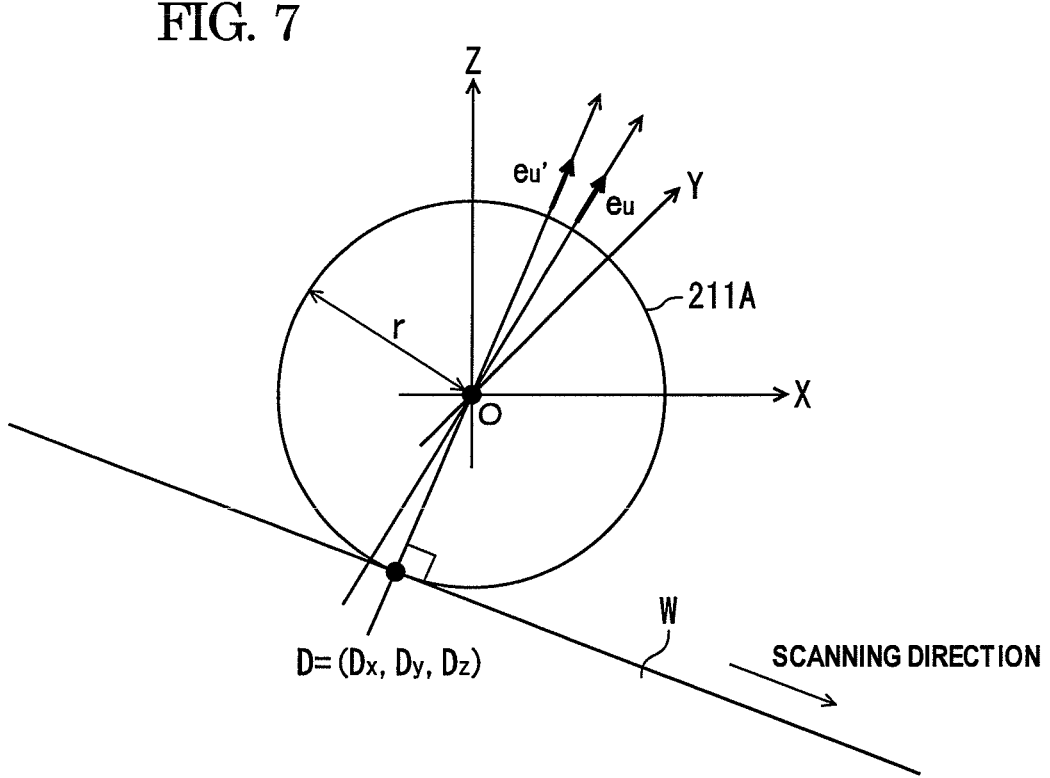
FIG. 7 illustrates a scanning measurement model with friction.

FIG. 6 illustrates a scanning measurement model without friction, and FIG. 7 illustrates a scanning measurement model with friction. In FIGS. 6 and 7, character D denotes a contact point between the stylus tip 211A and a workpiece W to be measured, character O denotes the center of the stylus tip 211A, and character r denotes the radius of the stylus tip 211A. As shown in FIG. 6, in the case where there is no friction between the stylus tip 211A and the workpiece W, the displacement direction of the probe 21 coincides with the normal direction of the workpiece W. Therefore, in this case, the unit vector $\vec{e_u}$ defined in the push direction is also in the normal direction of the workpiece W.

On the other hand, as shown in FIG. 7, in the case where friction exists between the stylus tip 211A and a workpiece W to be measured, the displacement direction of the probe 21 does not coincide with the normal direction of the workpiece W. In this case, if a push correction vector $\vec{Ve}$ is calculated so that a displacement direction of the probe 21 indicated by a unit vector $\vec{e_u}$ is employed as a push direction, a component vector having a direction that is different from the normal direction of the workpiece W (the direction indicated by a unit vector $\vec{e_u}'$) is involved. This may cause the probe 21 to be deviated in an unintended direction, resulting in reduction in measurement accuracy.

In view of the above, the push direction component calculating section 352 may calculate a push correction vector $\vec{Ve}$ taking such friction into consideration. A method for calculating a push correction vector $\vec{Ve}$ taking such friction into consideration will be described below.

FIG. 8 illustrates a method for calculating a push correction vector $\vec{Ve}$ in a case that a frictional force acts on the stylus tip 211A when it is moved in a scanning direction. In FIG. 8, O(x1, y1, z1) represents a current center position of the stylus tip 211A, O'(x0, y0, z0) represents a previous center position of the stylus tip 211A (i.e., a position where the center of the stylus tip 211A existed a prescribed time before), and C(Cx, Cy, Cz) represents a center position of the stylus tip 211A where it should exist if it were not in contact with a workpiece W to be measured (probe origin). (Mx, My, Mz) are coordinates calculated based on a movement distance of the slide mechanism 24 when the center of the stylus tip 211A is located at the current position O, and (Px, Py, Pz) are coordinates calculated based on a movement distance of the stylus 211 when the center of the stylus tip 211A is located at the current position O (i.e., a displacement from the probe origin C). (Nx, Ny, Nz) are a normal vector of the workpiece W when the center of the stylus tip 211A is located at the current position O, and r is the radius of the stylus tip 211A.

In FIG. 8, Q is the foot of the perpendicular from the probe origin C to a ling segment OO'. A vector $\vec{CQ}$ is located on a plane that is perpendicular to the scanning direction and is in the normal direction of the workpiece W. The vector $\vec{CQ}$ is given by the scanning Equation (5), and Equations (6) can be derived from Equation (5):

[Formula 5]

$$\vec{CQ}=(Nx,Ny,Nz)=\vec{CO}+\vec{OQ} \quad (5)$$

where $$\vec{CO}=(Px,Py,Pz)$$

$$\vec{OQ}=(|\vec{OQ}|/|\vec{OO'}|)\times\vec{OO'}=\{-\vec{OO'}\cdot\vec{CO}/|\vec{OO'}|^2\}\times\vec{OO'}$$

[Formula 6]

$$Nx=Px-(A/B)\times(x1-x0)$$

$$Ny=Py-(A/B)\times(y1-y0)$$

$$Nz=Pz-(A/B)\times(z1-z0)$$

where $$A=\vec{OD}\cdot\vec{CO}=(x1-x0)Px+(y1-y0)Py+(z1-z0)Pz$$

$$B=|\vec{OO'}|=(x1,x0)^2+(y1-y0)^2+(z1-z0)^2$$

Therefore, a unit vector $\vec{e_u}'$ in the normal direction of the workpiece W can be calculated according to an equation $\vec{e_u}'=(Nx/e, Ny/e, Nz/e)$ where $e=(Nx^2+Ny^2+Nz^2)^{1/2}$. And Nx, Ny, and Nz can be calculated according to Equations (6).

Therefore, the push direction component calculating section 352 can calculate a push correction vector $\vec{Ve}$ by substituting the unit vector $\vec{e_u}'$ into the above-mentioned Equation (3) instead of $\vec{e_u}$.

With the above-described processing, a push correction vector $\vec{Ve}$ can be calculated using a normal direction of the workpiece W as a push direction. As a result, an event that the probe 21 is deviated in an unintended direction due to friction can be prevented, whereby it becomes possible to perform a scanning measurement with even higher accuracy.

In the above example, a push correction vector $\vec{Ve}$ is calculated taking friction into consideration based on the points O and O' on the locus of the probe 21 and the displacement (Px, Py, Pz) of the probe 21. Alternatively, the motion controller 3 may calculate a push correction vector $\vec{Ve}$ by receiving normal direction data of a workpiece W to be measured from the host computer 5.

More specifically, when acquiring design information from the CAD system, the host computer 5 generates PCC data (see the above-mentioned Equations (2)) and further generates normal direction data of a workpiece W to be measured that correspond to the acquired design information. At step S3 of the above embodiment, the PCC acquiring unit 31 of the motion controller 3 acquires not only the PCC data but also the normal direction data from the host computer 5.

The number of normal direction data depends on the number T of parts into which a divisional PCC is divided. Where T=16, the number of normal direction data is equal to 17 (=16 (intermediate points and end point)+1 (start point)). These 17 normal direction data correspond to sets of coordinates that are obtained by substituting S=i×D/16 (i=0 to 16) into Equations (2). That is, coordinates Pi of each of division points of the divisional PCC (i.e., points that divide the divisional PCC) are given as follows:

$$i = 0: P0 = (X(0), Y(0), Z(0))$$

$$i = 1: P1 = (X(D/16), Y(D/16), Z(D/16))$$

...

$$i = t: Pt = (X(t\times D/16), Y(t\times D/16), Z(t\times D/16))$$

...

$$i = 16: P16 = (X(D), Y(D), Z(D))$$

During a PCC-data-based scan control, the push direction component calculating section 352 of the motion controller 3 calculates Pi that is closest to the center coordinates of the stylus tip 211A and calculates a push correction vector $\vec{Ve}$ using normal direction data corresponding to the calculated Pi as a push direction.

This method for calculating a push correction vector $\vec{Ve}$ enables a correct push direction control and hence a high-accuracy scanning measurement in the case where a workpiece W to be measured is very close to its design values or is deviated from its design values in a parallel manner as a whole.

However, where a workpiece W to be measured is deviated from its design values in various directions rather than in a parallel manner, it is preferable to calculate a push correction vector $\vec{Ve}$ according to the above-mentioned Equation (6) or using a displacement direction of the probe 21 as a push direction (above embodiment).

In this modification, the push direction component calculating section 352 calculates a push correction vector $\vec{Ve}$ using, as a push direction, a normal direction of the surface of a workpiece W to be measured based on design information of the workpiece W. That is, the push direction component calculating section 352 calculates a push correction vector $\vec{Ve}$ using a vector $\vec{CQ}$ as a push direction where C denotes the center point of the stylus tip 211A in a state that it is not in contact with the workpiece W (probe origin) and Q denotes the foot of the perpendicular from the point C to a scan movement line (path)

The scheme in which a push direction is determined based on a probe displacement direction is associated with the problem that a push direction may not coincide with a normal direction of a workpiece W to be measured due to friction between the stylus tip 211A and the workpiece W. If a push correction vector $\vec{Ve}$ is calculated based on such a probe displacement direction, the probe 21 may be deviated in an unintended direction. In contrast, in this modification, since as described above a push correction vector $\vec{Ve}$ is calculated along a normal direction of the workpiece W, such an unintended deviation of the probe 21 can be avoided, whereby a high-accuracy shape measurement is enabled.

In the above embodiment, the velocity synthesizing section 354 determines the scan drive gain Gf, the push direction correction gain Ge, and the locus correction gain Gc using the gain functions $f_1(E, C)$, $f_2(E)$, and $f_3(C)$, respectively. Alternatively, the velocity synthesizing section 354 may calculate a velocity synthesis vector $\vec{V}$ using preset gains. Even in this case, the stylus tip 211A can be moved along a path so as to scan the shape of a workpiece W to be measured. And a high-speed, high-accuracy shape measurement can be performed because deflections are taken into consideration.

When the invention is practiced, other specific items of the configuration can be modified as appropriate as long as the workpiece of the invention can be attained.

The invention can be applied to a shape measuring apparatus which measures a shape of a workpiece to be measured by a nominal scanning method.

What is claimed is:

1. A shape measuring apparatus comprising:
   a probe having a stylus tip at the tip;
   a mover that moves the stylus tip on a surface of a workpiece to be measured;
   an information acquirer, implemented by a processor, that acquires design information of the workpiece;
   a path setter, implemented by a processor, that sets a path along which the stylus tip is moved, based on the design information;
   a path component calculator, implemented by a processor, that calculates a path velocity vector which is a velocity component vector of the probe along the path;
   a push direction component calculator, implemented by a processor, that detects a deflection of the probe toward the workpiece, and calculates a push correction vector which is a velocity component vector to be used for correcting the deflection to a prescribed reference deflection;
   a locus correction component calculator, implemented by a processor, that detects an amount and a direction of locus deviation of the probe from the path, and calculates a locus correction vector which is a velocity component vector to be used for returning the probe position to the path based on a current position of the probe and the path;
   a velocity synthesizer, implemented by a processor, that calculates a velocity synthesis vector by combining the path velocity vector, the push correction vector, and the locus correction vector; and
   a drive controller, implemented by a processor, that moves the probe according to the velocity synthesis vector,
   wherein the push direction component calculator calculates the push correction vector using a normal direction of the workpiece at a position where the stylus tip is in contact with the surface of the workpiece as a push direction.

2. The shape measuring apparatus according to claim 1, wherein:
   the velocity synthesizer corrects the path velocity vector by multiplying the path velocity vector by a path direction gain, and calculates a velocity synthesis vector based on a corrected path velocity vector, the push correction vector, and the locus correction vector; and
   the path direction gain is set smaller when the difference between the deflection and the reference deflection is larger than a prescribed first threshold value and the locus deviation amount is larger than a prescribed second threshold value than when at least one of a condition that the difference is smaller than the first threshold value and a condition that the locus deviation amount is smaller than the second threshold value is satisfied.

3. The shape measuring apparatus according to claim 1, wherein:
   the velocity synthesizer corrects the push correction vector by multiplying a push direction correction gain, and calculates a velocity synthesis vector based on the path velocity vector, a corrected push correction vector, and the locus correction vector; and
   the push direction correction gain is set smaller when the difference between the deflection and the reference deflection is smaller than or equal to a prescribed first threshold value than when the difference is larger than the first threshold value.

4. The shape measuring apparatus according to claim 1, wherein:
   the velocity synthesizer corrects the locus correction vector by multiplying the locus correction vector by a locus correction gain, and calculates a velocity synthesis vector based on the path velocity vector, the push correction vector, and a corrected locus correction vector; and
   the locus correction gain is set smaller when the locus deviation amount is smaller than or equal to a prescribed second threshold value than when the locus deviation amount is larger than the second threshold value.

* * * * *